United States Patent Office

Re. 27,639
Reissued May 8, 1973

27,639

MOVING BED PROCESS USING SIEVE CATALYST TO MAKE XYLENES BY TOLUENE DISPROPORTIONATION AND TRANSALKYLATION WITH $C_9$–$C_{10}$ ALKYLBENZENES

Owen H. Thomas, South Holland, Thomas A. Beck, Park Forest, and Robert F. Wickman, Dolton, Ill., assignors to Atlantic Richfield Co., New York, N.Y.

No Drawing. Original No. 3,551,509, dated Dec. 29, 1970, Ser. No. 798,185, Feb. 10, 1969, which is a continuation-in-part of Ser. No. 747,840, July 26, 1968. Application for reissue Nov. 16, 1971, Ser. No. 199,338
Int. Cl. C07c *3/62*
U.S. Cl. 260—672 T 12 Claims

Matter enclosed in heavy brackets [ ] appears in the original patent but forms no part of this reissue specification; matter printed in italics indicates the additions made by reissue.

ABSTRACT OF THE DISCLOSURE

There is disclosed a process for catalytically disproportionating toluene to benzene and xylenes. The toluene is disproportionated over a rare-earth and hydrogen-exchanged crystalline aluminosilicate catalyst at about atmospheric pressure and a temperature of about 700 to 1100° F. Methylaromatics of 9 to 10 carbon atoms and 1 to 4 methyl groups may also be introduced into the reaction zone to increase the xylene/benzene ratio in the product.

This application is a continuation-in-part of application Ser. No. 747,840, filed July 26, 1968, *and now abandoned.* This invention relates to an improved process for catalytically disproportionating toluene to benzene and xylenes.

Under appropriate conditions and in the presence of a suitable catalyst, two moles of toluene will undergo disproportionation to yield benzene and xylene. The reaction is of particular value as a source of mixed xylenes from which the para-xylene isomer, used in the production of terephthalic acid, may be separated, for example by distillation to remove ortho-xylene bottoms, followed by crystallization to separate para-xylene from the meta-isomer. The yield of the para-isomer can be further increased by isomerizing the mixed xylenes in the crystallization mother liquor using known methods.

It has been known that disproportionation of toluene can be effected by use of a crystalline aluminosilicate-containing catalyst; this reaction has been accompanied, however, by impractically low yields and conversion levels. Thus, in U.S. Pat. No. 3,140,253 to Plank et al. is disclosed a toluene disproportionation experiment employing as the catalyst a rare earth and hydrogen-exchanged aluminosilicate promoted with tungsten and nickel. Helium pressure and a fixed catalyst bed were used, with a resultant conversion of 26.3 weight percent of the toluene feed, even though the catalyst contained nickel and tungsten promoters.

Similarly, Venuto et al. (Journal of Catalysis, vol. 4, pp. 81–98) have reported a conversion level of only 21% when toluene was disproportionated in the liquid phase using hydrogen pressure and rare earth-exchanged crystalline aluminosilicate.

By the method of the present invention exceptionally good yields of benzene and xylenes are obtained by disproportionation of toluene over rare earth- and hydrogen-exchanged crystalline aluminosilicate at about atmospheric pressure. The process may be operated continuously at economically feasible conversion and product yield levels without the formation of substantial quantities of undesirable coke or gas.

In accordance with the present invention toluene feed is introduced into the reaction zone of a moving bed reactor and contacted in the vapor phase, in the substantial absence of molecular hydrogen, with a concurrently moving bed of a catalyst containing crystalline aluminosilicate having associated therewith both rare earth and hydrogen ions, and benzene, xylenes and unreacted toluene are recovered from the reaction zone. Reaction conditions include a temperature of about 700 or 800 to 1100° F., preferably about 800 or 900 to 1000° F.; a weight hourly space velocity of about 0.2 to 5, preferably about 0.5 to 2; and, as mentioned above, approximately atmospheric pressures.

As stated above, the improved process of the present invention involves the use of a moving bed reactor and the passing of feed therethrough in the same direction as the movement of the catalyst through the reaction zone. Generally, there will be employed catalyst holding times of about 6 to 240, preferably about 12 to 60 minutes. Longer holding times result in higher coke build-up on the catalyst, thereby lowering catalyst activity. As used herein the expression "catalyst holding time" refers to the length of time that the catalyst remains in the reactor, and is determined by the equation:

$$\text{Holding time} = \frac{1}{(\text{WHSV})\,(\text{C/F})}$$

wherein WHSV is the weight hourly space velocity and C/F is the weight ratio of catalyst to feed.

The catalyst employed in the present invention may be in the form of macrosize particles, e.g. spheres, pellets, tablets, etc. regular or irregular in shape and generally from about 1/32 to 1/2 preferably about 1/8 to 1/4, inch in diameter and, if not spherical in form, from about 1/16 to 1, preferably from about 1/8 to 1/4, inch in length. The level of alkali metal present in the catalyst because of its poisoning effect, should be kept below about 1 percent, preferably below about 0.4 percent, based on the weight of the catalyst.

As more fully discussed hereinafter, a porous matrix for the crystalline aluminosilicate may advantageously be included in the catalyst; due to the relatively high cost of aluminosilicates, one wishes to use as little of this material which still permits the development of satisfactory catalyst properties. Advantageously, then, the major portion of the catalyst will be porous matrix, with minor amounts, say, at least about 1 wt. percent of the catalyst, being supplied by the crystalline aluminosilicate. Preferably, the crystalline aluminosilicate will comprise about 5 to 20 weight percent of the catalyst, percentages being based on dried solids content.

The crystalline aluminosilicate component of the catalyst used in the present invention has a pore size of about 8 to 15 A. and preferably the pores have a size of 10 to 14 A. Usually, with a given material, the pores are relatively uniform in size, and often the crystalline aluminosilicate particles are primarily less than about 15 microns in size, preferably less than about 2 microns. The molar ratio of silica to alumina in the aluminosilicate is generally about 2 to 12:1, preferaby about 2 to 6:1.

As mentioned above, the crystalline aluminosilicate components of the catalyst used in this invention has associated therewith both rare earth cations and hydrogen ions. The incorporation of these ions in the aluminosilicate may be by known methods, as for example by ion-exchange, using, for instance, the techniques disclosed by Plank et al. in U.S. Pat. No. 3,140,253. Thus, for example, a sodium aluminosilicate, the form in which the aluminosilicates are generally available, can be contacted with an aqueous solution containing both ammonium ions and rare earth cations. Exchange of the sodium ions by the ammonium and rare earth ions results, and subsequent calcination converts the ammonium ions to hydrogen ions (protons). Advantageously, the crystalline aluminosilicate will have associated therewith about 0.4 to 1, preferably about 0.6 to 1, equivalent per gram atom of aluminum of total hydrogen (including hydrogen ion precursors) and rare earth cations. Preferably, about 10 to 95% of the total equivalents of positive ion will be supplied by the rare earth cations and, correspondingly, about 5 to 90% will be made up of hydrogen ions. Particularly preferred are ranges of about 40 to 85% of rare earth cations and about 15 to 60% hydrogen ions.

Representative of the rare earth metals, the cations of which are associated with the crystalline aluminosilicate, are cerium, lanthanum, praesodymium, neodymium, promethium, samarium, europium, gadolinum, terbium, dysprosium, holmium, erbium, thulium, scandium, yetterbium and lutetium. Mixtures of rare earths, are, of course, suitable. Cerium, or a mixture containing a major amount of cerium, is most preferred.

Suitable matrices for the crystalline aluminosilicate include inorganic oxide gels, especially plural gels comprising about 55 to 90 weight percent of silica, based on dry solids, with about 10 to 45 percent of one or more oxides of metals selected from the Groups II–A, III and IV–A of the Periodic Chart. Amorphous silica-alumina containing about 55 to 90, preferably about 65 to 75, weight percent of silica and about 10 to 45, preferably about 25 to 35, weight percent of alumina is the preferred matrix for the crystalline aluminosilicate used in the process of the present invention. Mixing of the aluminosilicate with the porous matrix can be by known methods and can be undertaken either before or after modification of the aluminosilicate with rare earth and/or hydrogen, or hydrogen precursor, ions. Thus, for instance, where a silica-alumina gel is used as a matrix, finely divided crystalline sodium aluminosilicate can be mixed into a silica-alumina hydrogel, the mixture then treated with a water solution of rare earth and ammonium salts, washed with water, and dried. The exchange of the sodium ions also serves to reduce the alkali metal level of the catalyst to within the above-defined limits. Calcination, for example, at about 1200° F., converts the silica-alumina hydrogel to xerogel form, and, as mentioned above, converts the ammonium ions to hydrogen ions.

If more xylenes in relation to benzenes are desired from the process, the feedstock can be varied by introducing higher methylaromatics along with the toluene. These higher methylbenzenes have 9 to 10 carbon atoms and 1 to 4 methyl groups, and thus any other alkyl groups are ethyl or propyl. Thus, the aromatic streams available as a source of methyl groups for alkylation of toluene frequently do not consist only of methylaromatics. For example, the $C_9+$ product obtained from a xylene isomerization process normally contains substantial ethyl (and possibly higher alkyl) ring substituents. Ethyl or higher alkylaromatic substiutents tend to crack more readily than methyl groups to form olefins and the parent aromatic ring. Higher temperatures also promote the cracking reaction. As a result, the preferred conditions for a particular operation can be dependent on the composition of the $C_9+$ stream, the extent to which the $C_9+$ stream is recycled, and the ratio of benzene to xylenes desired in the product. In a process involving recycle, the ethyl substituents may also be controlled by fractionating and removing a portion of the stream rich in n-propylbenzenes and ethyltoluenes, or rich in ethylxylenes. The $C_9+$ hydrocarbons can be obtained from various sources such as naphtha reformate and coal tar, and in addition, the concentration of aromatics in the hydrocarbon streams can be increased by fractionation or solvent extraction procedures. Thus, trimethylbenzenes, for example, those formed as by-products of the disproportionation reaction, can be incorporated in the toluene feed, thus effecting additional xylene production through transalkylation. The amount of the higher methylaromatics added to the feed, either from an external supply or by recycling, can be a small amount effective to increase the xylene/benzene ratio in the product, as about 5 to 60, preferably about 15 to 50, weight percent based on the toluene fed to the reaction zone.

The following examples are submitted for purposes of illustration only, and are not to be considered limiting.

EXAMPLE I

Toluene was disproportionated to benzene and xylenes using a bench scale moving bed reactor. In each run the catalyst was dried and/or calcined at 950°–1000° F. in a muffle furnace prior to use.

Toluene feed was moved through the reactor in the same direction as the bed until the reaction zone temperatures were lining out. After line-out an equilibration prerun was made equal in time to the catalyst holding time used in any given run. Sufficient product was collected to insure obtaining accurate data on liquid product, gas and coke distribution.

The bench scale moving bed reactor used in these runs comprises a vertically disposed, one and one-half inch (I.D.) stainless steel, cylindrical reaction column termin-

TABLE I

| | Catalyst | | | | | | | | |
|---|---|---|---|---|---|---|---|---|---|
| | A (Virgin) [1] | B (Virgin) | B (Lab. equil.) [2] | C (Virgin) | C (High equil.) [3] | C (Low equil.) [4] | D (Virgin) | D (equil. abrad.) [5] | E (Virgin) |
| Physical properties: | | | | | | | | | |
| Surface Area, m.²/g | 202 | 290 | 106 | 224 | 147 | 115 | 167 | 113 | 116 |
| Tyler screen analysis, wt. percent: | | | | | | | | | |
| On 4 mesh | 2.5 | | 4.3 | 10.3 | 5.6 | 3.8 | | 11.6 | 22.4 |
| On 7 mesh | 92.7 | | 95.5 | 87.2 | 87.8 | 89.7 | | 84.0 | 69.7 |
| Pass 7 mesh | 4.8 | | 0.2 | 2.5 | 6.6 | 6.5 | | 4.4 | 7.9 |
| Average particle diameter, in. | 0.141 | | 0.149 | 0.152 | 0.149 | 0.148 | | 0.151 | 0.153 |
| Cat-A activity, vol. percent (Gasoline, 410° F., E.P.) | 38.8 | 46.3 | 30.5 | 61.5 | 54.4 | 48.0 | 65.0 | 53.6 | 63.5 |
| Composition (Overall): | | | | | | | | | |
| $Al_2O_3$, wt. percent | 9.7 | 11.8 | | 11.61 | 11.43 | 12.01 | 45.20 | 41.53 | 48.91 |
| $SiO_2$, wt. percent | 90.9 | 87.9 | | 83.40 | 83.90 | ~83 | ~52 | 55.80 | 48.20 |
| V, p.p.m. | 0.0005 | | | <20 | 37 | 73 | 117 | 31 | 44 |
| Cr., wt. percent | 0.15 | 0.1 | | 0 | 0 | 0.056 | 0.084 | 0.064 | .13 |
| Ni, p.p.m. | 0.00041 | | | <10 | 38 | 36 | 7.6 | 19 | 6 |
| Na, wt. percent | 0.1 | | | 0.221 | 0.221 | 0.118 | 0.209 | 0.138 | 0.01 |
| Fe, wt. percent | | | | 0.04 | 0.05 | 0.052 | 0.039 | 0.035 | 0.020 |
| MgO, wt. percent | | | | 0 | 0 | | | 0.036 | 0 |
| CaO, wt. percent | | | | 0 | 0 | | | 0.09 | |
| Ba, wt. percent | | | | | | | | 0.0 | |
| $SO_4$, wt. percent | | | | | | | | <0.5 | |
| Oxides of rare earths, wt. percent | | | | 2.53 | 2.48 | 2.70 | 2.68 | | 1.59 |
| Volatiles, wt. percent | | | | 1.79 | 0.73 | 1.20 | 2.04 | 0.41 | 1.24 |

[1] Weight percent.
[2] Laboratory equilibrated by steaming for 4 hours at 1,200° F.
[3] Moderately equilibrated in commercial cracking unit, but still possessing relatively high activity.
[4] Severely equilibrated in commercial cracking unit to relatively low activity.
[5] Equilibrated in commercial cracking unit, then abraded to remove $BaSO_4$, a surface lubricant.

ating at its upper end in a fresh catalyst hopper and at its lower end in a spent catalyst withdrawal zone. The particulate catalyst moves continuously downward through the column by force of gravity and there is continuously introduced midway in the moving bed of catalyst the preheated, vaporized feed. Reaction products are withdrawn from the column, separately from the catalyst, via a variable position product outlet line located below the feed entry line and above the spent catalyst withdrawal zone. Thus, an intermediate section of the vertical column, the length of which is variable according to the location of the outlet line, comprises the reaction zone. Streams of nitrogen are introduced to the column at points above and below the reaction zone to prevent the hydrocarbon feed and products from being carried up the column to the fresh catalyst hopper or down the column to the catalyst withdrawal zone. Reactor and feed are heated by means of a radiant furnace. The product outlet line is cooled to room temperature in a water bath and condensed product is collected in a one-liter flask.

The liquid products from each run were analyzed with a gas chromatograph using a 100 ft. x 0.01 inch (I.D.) stainless steel adsorption column coated with di-n-decylphthalate. Column temperature was approximately 90° C.

The following catalysts were employed in the runs:

Catalyst A

A commercially available cracking catalyst consisting of a synthetic, amorphous silica-alumina xerogel and having an activity index of about 38.

Catalyst B

A commercially available cracking catalyst substantially the same as catalyst A above, but having an activity index of about 42, apparently due to its being less severely steamed than catalyst A.

Catalyst C

A commercially available cracking catalyst comprising a mixture of a synthetic, amorphous silica-alumina xerogel and about 7.5% of a hydrogen- and rare earth-exchanged, crystalline aluminosilicate (CAS), the CAS having a molar ratio of silica to alumina of about 2.5 to 1, a pore size of about 13 A., and an average particle size less than about 5 microns. The catalyst itself is macrosized, having an average particle diameter of about 0.15 inch, and has a rare earth oxides content of about 2.5 weight percent, with cerium oxide being the predominant component.

Catalyst D

A commercially available catalyst similar to catalyst C but additionally containing about 33 weight percent of inert alpha-alumina fines.

Catalyst E

A commercially available catalyst similar to catalyst D except that catalyst E contained only about 5 weight percent of the hydrogen- and rare earth-exchanged crystalline aluminosilicate and the crystalline aluminosilicate had a silica to alumina mole ratio of about 4.5:1.

In Table I are presented further analytical data on the various catalysts employed.

In Table II are presented conditions and product analyses of sample runs with the above catalysts. In all of the runs except Run 12 the feed used was straight nitration grade toluene. Run 12 was made with a feed consisting of 95 mole percent toluene and 5 mole percent 1,2,4-trimethylbenzene. The effect on the xylene production which results from the inclusion of the trimethylbenzene in the feed can thus be observed by comparison of the recovery data presented for Run 08 (using straight toluene) and Run 12.

TABLE II

| | Run number | | | | | | | | | | | | | | | | | | | | | | |
|---|---|---|---|---|---|---|---|---|---|---|---|---|---|---|---|---|---|---|---|---|---|---|---|
| | 35 | 36 | 37 | 62 | | 70 | | 72 | | 76 | | 79 | 82 | 08 | 12 [2] | 21 | 25 | 27 | 52 | 11 | | | |
| | Catalyst | | | | | | | | | | | | | | | | | | | | | | |
| | A (Virgin) | B (Virgin) | None [1] | B (Lab. equil.) | B (Lab. equil.) | B (Lab. equil.) | C (Virgin) | C (Virgin) | C (Virgin) | C (Virgin) | C (Virgin) | C (High equil.) | C (High equil.) | C (High equil.) | D (Virgin) | D (Equil. abrad.) | C (Low equil.) | C (Low equil.) | C (Low equil.) | C (High equil.) |
| Conditions: | | | | | | | | | | | | | | | | | | | | | | | |
| Temperature, ° F | 1,149 | 1,151 | 1,149 | 1,150 | 1,150 | 1,150 | 1,070 | 946 | 1,016 | 899 | 950 | 952 | 949 | 950 | 1,003 | 998 | 952 |
| WHSV | 0.66 | 0.65 | 0.25 | 0.81 | 0.22 | 0.22 | 1.04 | 0.92 | 0.42 | 1.00 | 1.00 | 1.00 | 1.00 | 0.37 | 2.05 | 0.20 | 0.45 |
| Catalyst holding time, min | 30.2 | 30.5 | ---- | 12.3 | 20.3 | 20.3 | 60.0 | 63.0 | 157.2 | 52.4 | 52.8 | 63 | 159 | 244 | 132 |
| Bed length, in | 12 | 12 | 20 | ---- | ---- | ---- | 8 | 21 | 21 | 21 | 21 | 21 | 21 | 16 | 21 |
| Recovery: Mole percent toluene converted | 19.74 | 29.61 | 7.88 | 31.78 | 54.70 | 39.62 | 30.8 | 33.6 | 33.65 | 21.54 | 17.34 | 31.38 | 21.99 | 16.84 | 27.57 | 25.05 |
| Selectivity, mole percent: | | | | | | | | | | | | | | | | | |
| To benzene | 48.21 | 56.24 | 26.95 | 55.15 | 54.79 | 50.26 | 47.6 | 55.2 | 49.29 | 48.63 | 32.43 | 51.33 | 48.74 | 50.49 | 45.95 | 48.22 |
| To xylenes | 32.04 | 29.37 | 7.23 | 29.99 | 18.67 | 36.33 | 39.9 | 35.7 | 42.18 | 43.46 | 64.24 | 40.93 | 43.68 | 41.42 | 45.95 | 42.77 |
| Wt. percent para in xylenes | 25.0 | 25.2 | 14.3 | 24.77 | 22.94 | 23.80 | 25.3 | 23.9 | 24.89 | 25.02 | 24.71 | 25.22 | 24.93 | 25.87 | 25.22 | 25.26 |
| Ultimate yield (wt. percent of conversion product): | | | | | | | | | | | | | | | | | |
| Benzene | 40.53 | 47.70 | 22.84 | 46.75 | 56.44 | 39.70 | 40.5 | 46.8 | 41.78 | 41.34 | 23.37 | 43.63 | 41.36 | 42.84 | 38.97 | 40.86 |
| Xylenes | 37.85 | 33.88 | 9.52 | 34.86 | 21.69 | 39.02 | 46.2 | 41.3 | 49.12 | 50.56 | 63.23 | 47.69 | 50.82 | 48.07 | 48.00 | 49.76 |
| $C^9$ and greater | 2.88 | 2.16 | 0.63 | 2.58 | 2.49 | 5.17 | 5.3 | 3.9 | 5.53 | 4.42 | 10.93 | 4.82 | 4.19 | 3.27 | 4.17 | 4.47 |
| Gas | 8.84 | 3.72 | 43.78 | 4.66 | 13.01 | 2.93 | 5.1 | 3.4 | 1.22 | 2.14 | 1.21 | 1.88 | 2.87 | 2.32 | 6.09 | 3.43 |
| Coke | 9.60 | 12.52 | 23.22 | 11.17 | 16.37 | 13.18 | 2.8 | 4.6 | 2.35 | 1.54 | 1.26 | 1.98 | 0.77 | 3.50 | 2.00 | 1.48 |

[1] Low area inert alumina used in place of catalyst.
[2] 5 mole percent 1,2,4-trimethylbenzene included in the feed.

EXAMPLE II

Toluene was transalkylated in a bench scale, moving catalyst bed reactor using varying amounts of $C_9$+ methylaromatics added to the feedstock. The catalyst in each run was catalyst E described in Example I. The feed was moved through the reactor in the same direction as the catalyst bed until the reaction zone temperatures were lined out. After lineout, an equilibration pre-run was made equal in time to the catalyst holding time used in the runs. Sufficient product was collected to insure obtaining accurate data on liquid product, gas and coke distribution. The apparatus used was similar to that described in Example I.

The $C_9$+ feedstock addition had the composition shown in Table III below. Table IV shows the conditions and product analyses of the sample runs with the varying $C_9$+ feedstock additions.

TABLE III

| Component: | Weight percent |
|---|---|
| n-Propylbenzene | 0.36 |
| Ethyltoluenes | 10.71 |
| Trimethylbenzenes | 68.20 |
| Diethylbenzenes | 2.65 |
| Ethylxylenes | 14.06 |
| Tetramethylbenzenes | 2.88 |
| $C_{11}$+ | 1.13 |

TABLE IV

| Run number | 69 | | 65 | | 75 | | 67 | | 72 |
|---|---|---|---|---|---|---|---|---|---|
| Temperature, ° F | 949 | | 902 | | 950 | | 851 | | 951 |
| Total WHSV | 1.61 | | 1.16 | | 1.54 | | 1.61 | | 1.56 |
| Catalyst holding time (min.) | 36 | | 36 | | 36 | | 36 | | 36 |
| Pressure (p.s.i.a.) | 24.83 | | 24.91 | | 24.83 | | 25.09 | | 25.02 |
| Nominal wt. percent $C_9$+ | 5 | | 9 | | 25 | | 50 | | 50 |
| | Feed | Product | Feed | Product | Feed | Product | Feed | Product | Product |
| Analyses, wt. percent: | | | | | | | | | |
| Nonaromatics | 0.06 | 0.01 | 0.19 | 0.15 | 0.10 | 0.11 | 0.04 | 0.34 | 0.13 |
| Benzene | 0.10 | 7.32 | 0.10 | 5.00 | 0.09 | 4.41 | 0.05 | 1.13 | 1.84 |
| Toluene | 95.24 | 74.17 | 91.13 | 74.33 | 75.32 | 58.03 | 49.54 | 38.57 | 40.13 |
| Ethylbenzene | (1) | 0.32 | 0.03 | 0.52 | 0.03 | .88 | -------- | 1.05 | 0.99 |
| Xylenes | (1) | 14.88 | (1) | 15.56 | (1) | 24.50 | -------- | 25.78 | 27.81 |
| n-Propylbenzene | (1) | ---------- | 0.02 | ---------- | 0.10 | 0.01 | 0.17 | 0.08 | 0.04 |
| Ethyltoluenes | 0.51 | 0.66 | 0.94 | 1.29 | 2.71 | 2.33 | 5.31 | 5.32 | 4.05 |
| Trimethylbenzenes | 3.34 | 1.72 | 6.03 | 2.32 | 17.02 | 7.17 | 34.76 | 19.38 | 18.48 |
| Diethylbenzenes | 0.04 | ---------- | 0.14 | 0.01 | 0.41 | 0.02 | 1.90 | 0.26 | 0.14 |
| Ethylxylenes | 0.52 | 0.01 | 1.14 | 0.14 | 3.29 | 0.56 | 7.18 | 3.15 | 1.83 |
| Tetramethylbenzenes | 0.19 | ---------- | 0.22 | 0.06 | 0.37 | 0.52 | 1.43 | 3.07 | 2.42 |
| Cu | | | 0.04 | 0.03 | 0.38 | 0.05 | 0.43 | 0.53 | 0.16 |
| Gas | | 0.44 | -------- | 0.28 | -------- | 0.86 | -------- | 0.86 | 1.45 |
| Coke | | 0.46 | -------- | 0.30 | -------- | 0.56 | -------- | 0.48 | 0.52 |
| Results: | | | | | | | | | |
| Toluene conversion, wt. percent | | 22.12 | -------- | 18.44 | -------- | 22.96 | -------- | 22.14 | 18.99 |
| $C_9$+conversion, wt. percent | | 48.04 | -------- | 54.87 | -------- | 56.42 | -------- | 36.89 | 46.16 |
| Percent methyl group recovery | | 99.92 | -------- | 100.12 | -------- | 98.67 | -------- | 98.24 | 97.06 |
| Percent ethyl group recovery | | 97.73 | -------- | 90.10 | -------- | 55.86 | -------- | 73.89 | 50.79 |
| Wt. percent xylene per pass | | 15.20 | -------- | 16.05 | -------- | 25.35 | -------- | 26.83 | 28.80 |
| Wt. percent benzene per pass | | 7.22 | -------- | 4.90 | -------- | 4.32 | -------- | 1.08 | 11.79 |
| Wt. ratio xylenes/benzene | | 2.11 | -------- | 3.27 | -------- | 5.87 | -------- | 24.81 | 16.09 |

[1] Trace.

A comparison of runs 69, 75 and 72 which vary $C_9$+ content at comparable reaction conditions demonstrates increased xylene make with increased $C_9$+. As may be seen from the product data, the xylene to benzene ratio of the product under these comparable conditions increased from about 2:1 at 5% $C_9$+ (which is slightly larger than the ratio for 0% $C_9$+ feed addition) to about 6:1 for 25% $C_9$+ and about 14:1 for 50% $C_9$+ feedstock additions. It is thus apparent that not only will small amounts of $C_9$+ feedstock additions increase the xylene make in the product but that the amount of xylenes in the product increases when up to equimolar amounts of $C_9$+ and toluene are present in the feedstock. A comparison of runs 67 and 72 at 50 weight percent $C_9$+ and temperatures of 850° F. and 950° F., respectively, demonstrates a decrease in xylenes/benzene ratio with increasing temperature as well as net increases in both xylene and benzene per pass. The same runs point up the increased loss in ethyl groups with increased temperature.

It is claimed:

1. A method of disproportionating toluene to benzene and xylenes comprising introducing toluene feed into a reaction zone and contacting the feed therein in the vapor phase in the substantial absence of molecular hydrogen, at a temperature of about 700 to 1100° F. and a weight hourly space velocity of about 0.2 to 5, with a concurrently moving bed of a crystalline aluminosilicate-containing catalyst having an alkali metal content of less than about 1 weight percent, said aluminosilicate having a molar ratio of silica to alumina of about 2 to 12:1, pore openings of about 8 to 15 A. and having both rare earth and hydrogen ions, and removing from said reaction zone a product stream comprising benzene, xylenes and unreacted toluene.

2. The method of claim 1 wherein the crystalline aluminosilicate is present in a matrix of amorphous silica-alumina xerogel.

3. The method of claim 2 wherein the crystalline aluminosilicate is present in the catalyst in an amount of about 1 to 20 weight percent, the essential balance being the silica-alumina xerogel.

4. The method of claim 3 wherein the crystalline aluminosilicate has about 0.4 to 1 equivalent of rare earth cations and hydrogen ions per gram atom of alumina in said aluminosilicate.

5. The method of claim 4 wherein at least a major portion of the rare earth cations is cerium cations.

6. The method of claim 1 wherein methylaromatics of 9 to 10 carbon atoms and 1 to 4 methyl groups are fed to the reaction zone to provide a combined feed containing a sufficient amount of the $C_9$ to $C_{10}$ methylaromatics effective to increase the xylene-benzene ratio in the product.

7. The method of claim 6 wherein said methylaromatics of 9 to 10 carbon atoms are fed to the reaction zone in an amount of about 15 to 50 weight percent of the toluene feed to the reaction zone.

8. A method of disproportionating toluene to benzene and xylenes comprising introducing toluene feed into a reaction zone and contacting the feed therein in the vapor phase in the substantial absence of molecular hydrogen, at about atmospheric pressure, a temperature of about 900 to 1000° F., a weight hourly space velocity of about 0.5 to 2, and a catalyst holding time of about 6 to 240 minutes, with a concurrently moving bed of macrosize catalyst consisting essentially of about 5 to 20 weight percent of crystalline aluminosilicate having a molar ratio of silica to alumina of about 2 to 6:1 and pore opening of about 8 to 15 A., and an essential balance of silica-alumina xerogel containing about 55 to 90 weight percent silica and about 10 to 45 weight percent alumina, said catalyst having an alkali metal content of less than about 0.4 weight percent and said aluminosilicate having about 0.6 to 1 equivalent of positive ions, consisting essentially of about 10 to 95% cerium cations and about 5 to 90% hydrogen ions, per gram atom of aluminum in the aluminosilicate, and recovering from said reaction zone a product stream comprising benzene, xylenes and unreacted toluene.

9. The method of claim 8 wherein the catalyst holding time is about 12 to 60 minutes.

10. The method of claim 9 wherein about 40 to 85% of the positive ions of the aluminosilicate are cerium cations and about 15 to 60% are hydrogen ions.

11. The method of claim 10 wherein the crystalline aluminosilicate has pore openings of about 10 to 14 A.

12. The method of claim 11 wherein methylaromatics of 9 to 10 carbon atoms are fed to the reaction zone in an amount of about 15 to 50 weight percent of the toluene feed to the reaction zone.

References Cited

The following references, cited by the Examiner, are of record in the patented file of this patent or the original patent.

UNITED STATES PATENTS

| | | | |
|---|---|---|---|
| 3,140,253 | 7/1964 | Plank et al. | 208—120 |
| 3,214,485 | 10/1965 | Burk et al. | 260—668 |
| 3,350,469 | 10/1967 | Ryan | 260—672 |
| 3,437,710 | 4/1969 | Pollitzer | 260—672 |
| 3,442,966 | 5/1969 | Pollitzer | 260—672 |

CURTIS R. DAVIS, Primary Examiner

U.S. Cl. X.R.

252—455 Z; 260—668 A, 673.5, 674 A

UNITED STATES PATENT OFFICE
CERTIFICATE OF CORRECTION

Patent No. Reissue 27639 Dated May 8, 1973

Inventor(s) Owen H. Thomas, Thomas A. Beck & Robert F. Wickman

It is certified that error appears in the above-identified patent and that said Letters Patent are hereby corrected as shown below:

Patent Front Page Format, after related U.S. application data and before the International Classification should appear:

--Claims priority, application Canada, January 8, 1968--.

Signed and sealed this 27th day of November 1973.

(SEAL)
Attest:

EDWARD M.FLETCHER, JR.
Attesting Officer

RENE D. TEGTMEYER
Acting Commissioner of Patents